(12) United States Patent
Shin et al.

(10) Patent No.: US 7,956,505 B2
(45) Date of Patent: Jun. 7, 2011

(54) ROTOR OF ELECTRIC MOTOR FOR SIMPLIFYING MANUFACTURING PROCESS AND ELECTRIC MOTOR HAVING THE SAME

(75) Inventors: Hyun-Hun Shin, Seoul (KR); Jun-Ho Ahn, Seoul (KR); Jae-Yoon Oh, Gyeonggi-Do (KR); Dal-Ho Cheong, Seoul (KR)

(73) Assignee: LG Electronics Inc., Seoul (KR)

( * ) Notice: Subject to any disclaimer, the term of this patent is extended or adjusted under 35 U.S.C. 154(b) by 556 days.

(21) Appl. No.: 11/738,588

(22) Filed: Apr. 23, 2007

(65) Prior Publication Data

US 2007/0247012 A1  Oct. 25, 2007

(30) Foreign Application Priority Data

Apr. 25, 2006  (KR) .................. 10-2006-0037352

(51) Int. Cl.
*H02K 11/00* (2006.01)
(52) U.S. Cl. .................. 310/156.06; 310/156.53
(58) Field of Classification Search ............. 310/156.05, 310/156.06, 156.53, 156.74–156.79, 82, 310/83
See application file for complete search history.

(56) References Cited

U.S. PATENT DOCUMENTS

| | | | |
|---|---|---|---|
| 4,139,790 A | | 2/1979 | Steen |
| 5,864,192 A | * | 1/1999 | Nagate et al. ............ 310/156.05 |
| 6,218,753 B1 | * | 4/2001 | Asano et al. ............. 310/156.53 |
| 6,858,956 B2 | * | 2/2005 | Nakajima .................... 310/68 B |
| 6,972,503 B2 | * | 12/2005 | Hasumi ..................... 310/156.43 |
| 6,984,908 B2 | * | 1/2006 | Rinholm et al. ......... 310/156.08 |
| 7,019,427 B2 | * | 3/2006 | Sasaki et al. ............. 310/156.78 |
| 2001/0033113 A1 | * | 10/2001 | Takano ......................... 310/67 R |
| 2004/0174083 A1 | | 9/2004 | Han et al. |
| 2005/0057111 A1 | | 3/2005 | Han et al. |
| 2006/0284512 A1 | | 12/2006 | Lee et al. |

FOREIGN PATENT DOCUMENTS

| | | |
|---|---|---|
| CN | 1434557 | 8/2003 |
| CN | 1503430 | 6/2004 |
| KR | 19990057088 | 7/1999 |

OTHER PUBLICATIONS

U.S. Appl. No. 11/738,575 to Lee et al., filed Apr. 23, 2007.
English Language Abstract of KR 1999-0057088.
Chinese Office Action dated Aug. 21, 2009.

* cited by examiner

*Primary Examiner* — Quyen Leung
*Assistant Examiner* — Naishadh N Desai
(74) *Attorney, Agent, or Firm* — KED & Associates LLP

(57) ABSTRACT

A rotor of an electric motor includes lamination core formed by laminating a plurality of individual cores, and at least one pair of magnet members that generate rotating torque by electromagnetic interaction with a stator, are provided at the lamination core such that a magnetic sensor can sense magnetic flux, and have magnetic poles opposite to each other, such that a position of the rotor of the electric motor can be accurately detected and a process of manufacturing the electric motor can be simplified.

11 Claims, 4 Drawing Sheets

ROTOR OF ELECTRIC MOTOR FOR SIMPLIFYING MANUFACTURING PROCESS AND ELECTRIC MOTOR HAVING THE SAME

CROSS-REFERENCE TO RELATED APPLICATIONS

This application claims priority under 35 U.S.C. §119 to Korean Patent Application No. 2006-37352, filed in Korea on Apr. 25, 2006, the entirety of which is hereby incorporated by reference.

BACKGROUND OF THE INVENTION

1. Field of the Invention

The present invention relates to an electric motor, and more particularly, to a rotor of an electric motor that has a simplified structure and is improved so as to accurately detect a position of the rotor, and an electric motor having such a rotor.

2. Description of the Background Art

In general, an electric motor has a housing, a stator provided in the housing and having a coil wound thereon, a rotary shaft supported to the housing so as to be rotatable, and a rotor having the rotary shaft pressingly inserted and fixed to the center thereof, the rotor moving by electromagnetic interaction with the stator.

In addition, a plurality of pairs of permanent magnets having magnetic poles opposite to each other are inserted into the rotor in a direction of the rotary axis of the rotor. Magnetic flux of the magnets is linked through the coil of the stator so as to generate rotating torque that rotates the rotor.

Here, a control unit needs to detect a position of the rotor in order to continuously drive the rotor and control rotative velocity of the rotor. When detecting the position of the rotor, the control unit controls a current, which is applied to the stator, on the basis of the position of the rotor, so as to continuously drive the rotor or control the rotative velocity of the rotor.

In general, in order to detect the position of the rotor, a sensor magnet is separately provided at the rotary shaft, and a hall sensor is provided to be adjacent to the sensor magnet.

The hall sensor senses changes in magnetic flux that are made by the sensor magnet by rotation of the rotary shaft, and converts the changes in the magnetic flux into an electrical signal. The converted electrical signal is transmitted to the control unit. The control unit controls a current, which is applied to the stator, according to the transmitted signal. At this time, the sensor magnet needs to be provided at an accurate position that corresponds to magnetic poles of the permanent magnets that are inserted into the rotor.

However, an assembly error may occur in a process of assembling the sensor magnet. When the assembly error exceeds the maximum permissible limit, an error with respect to the detected position of the rotor increases, and thus, an error in controlling the rotation of the rotor correspondingly occurs.

In addition, since a process of magnetizing the sensor magnet and a process of assembling the sensor magnet so as to be provided at the rotary shaft are needed, there is a limitation on simplification of an assembly process.

Recently, a permanent magnet type synchronous reluctance motor having permanent magnets inserted into flux barriers has been used, but this type of motor has the same problems.

BRIEF DESCRIPTION OF THE INVENTION

Therefore, an object of the present invention is to provide a rotor of an electric motor capable of accurately detecting a position of the rotor, and an electric motor having the rotor.

Another object of the present invention is to provide a rotor of an electric motor and an electric motor having the rotor that can reduce the number of components and simplify a manufacturing process.

To achieve these and other advantages and in accordance with the purpose of the present invention, as embodied and broadly described herein, there is provided a rotor of an electric motor which comprises a lamination core formed by laminating a plurality of individual cores, and at least one pair of magnet members that generate rotating torque by electromagnetic interaction with a stator, the at least one pair of magnet members provided at the lamination core such that a magnetic sensor can sense magnetic flux, and the at least one pair of magnet members having magnetic poles opposite to each other. Here, the rotor rotates by electromagnetic interaction with the stator and a position of the rotor is detected by the magnetic sensor.

Here, at least one of the magnet members has a protruding portion that protrudes from the lamination core in a direction adjacent to the magnetic sensor.

In addition, first and second end plates may be coupled with both ends of the lamination core, respectively, and one of the magnet members may have a protruding portion that protrudes from one of the first and second end plates in a direction adjacent to the magnetic sensor.

Moreover, a plurality of flux barrier portions may radially be formed on the lamination core so as to be opposite to each other, and the magnet members may individually be provided in the flux barriers such that magnetic poles of the magnet members alternate with each other in a circumferential direction. Preferably, six flux barriers are disposed at predetermined intervals therebetween in the circumferential direction, and the magnet members are individually inserted into the flux barrier members.

In addition, a protective member formed of plastic is provided at one end of the lamination core so as to protect the protruding portions, and preferably, the lamination core has the same radius as the protective member. A second end plate may be interposed between the protective member and the lamination core.

Preferably, the magnetic sensor is a hall sensor.

To achieve these and other advantages and in accordance with the purpose of the present invention, as embodied and broadly described herein, there is provided an electric motor which includes a housing, a stator fixed to the housing, a rotor rotating by electromagnetic interaction with the stator, a rotary shaft rotatably provided in the housing and fixed to the rotor, and a magnetic sensor detecting a position of the rotor. Here, the rotor includes a lamination core formed by laminating a plurality of individual cores, and at least one pair of magnet members that generate rotating torque by electromagnetic interaction with the stator, are provided at the lamination core such that the magnetic sensor can sense magnetic flux, and have magnetic poles opposite to each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incor- In the drawings.

DETAILED DESCRIPTION OF THE INVENTION

Reference will now be made in detail to the preferred embodiments of a rotor and an electric motor having the same of the present invention, examples of which are illustrated in the accompanying drawings. In the preferred embodiments, a permanent magnet type synchronous reluctance motor is described for the illustrative purpose, but is not intended to limit the present invention. The present invention can be applied to various kinds of motors having permanent magnets.

Figure 1:
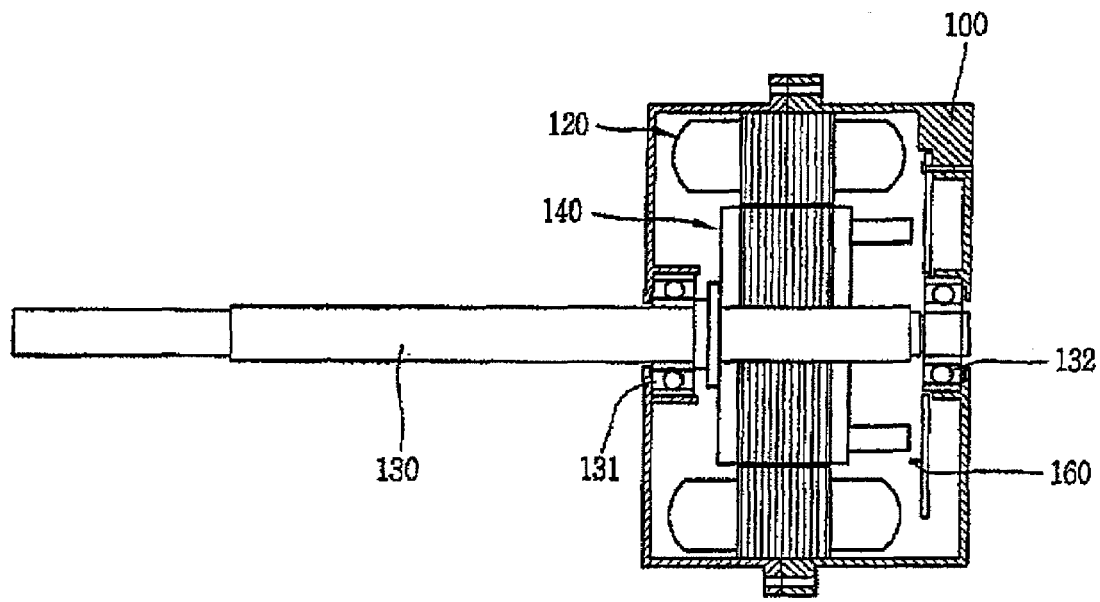
FIG. 1 is a cross-sectional view schematically illustrating an electric motor according to one embodiment of the present invention.
Figure 2:
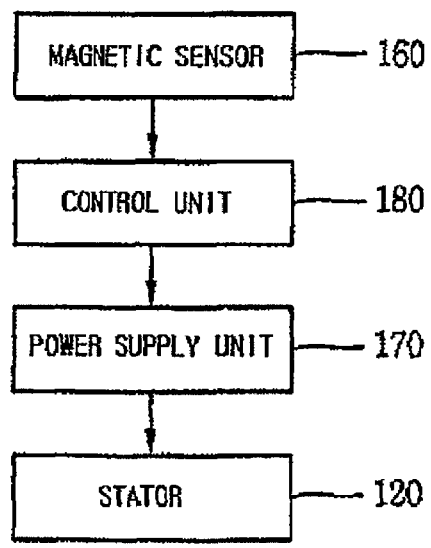
FIG. 2 is a control block diagram for detecting a position of a rotor of the electric motor shown in FIG. 1.

Referring to FIG. 1 and FIG. 2, an electric motor according to one embodiment of the present invention includes a housing 100, a stator 120 fixed to the housing 100, a rotary shaft 130 provided in the housing 100 so as to be rotatable, a rotor 140 rotating by electromagnetic interaction with the stator 120, a magnetic sensor 160 detecting a position of the rotor 140, a power supply unit 170 supplying a current to the stator 120, and a control unit 180 controlling the current, which is applied to the stator 120, according to a signal output from the magnetic sensor 160.

The housing 100 is formed by engaging two housings with each other by a bolt or the like. Components, such as the rotary shaft 130, of the electric motor are supported to the housing 100.

The stator 120 is fixed into the housing 100. The stator 120 has a plurality of slots (not shown), and a coil is wound around the plurality of slots.

The rotary shaft 130 is inserted into first and second bearings 131 and 132 that are fixedly provided to the housing 100. According to this structure, the rotary shaft 130 is supported to the housing 100 so as to be rotatable. One end of the rotary shaft 130 extends from the housing 100 and is connected with a load side (not shown).

Figure 3:
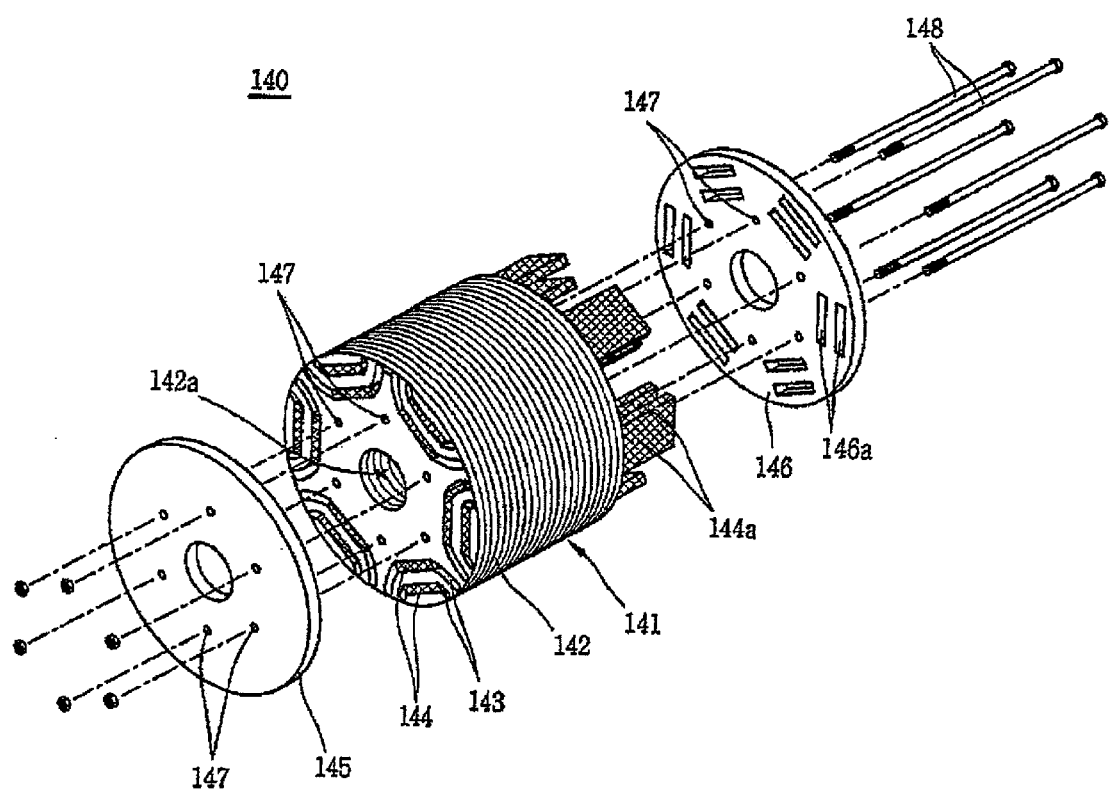
FIG. 3 is an exploded perspective view schematically illustrating the rotor shown in FIG. 1.
Figure 4:
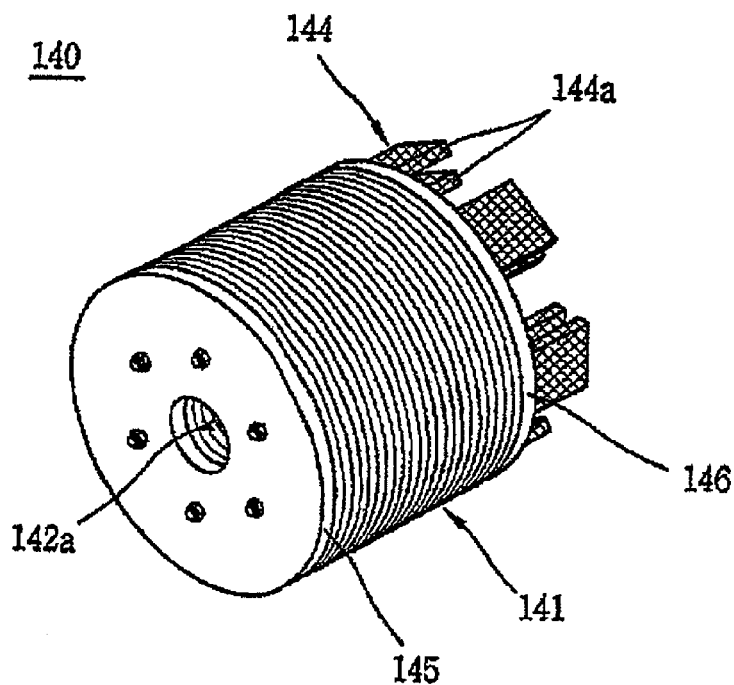
FIG. 4 is an assembled perspective view of FIG. 2.
Figure 5:
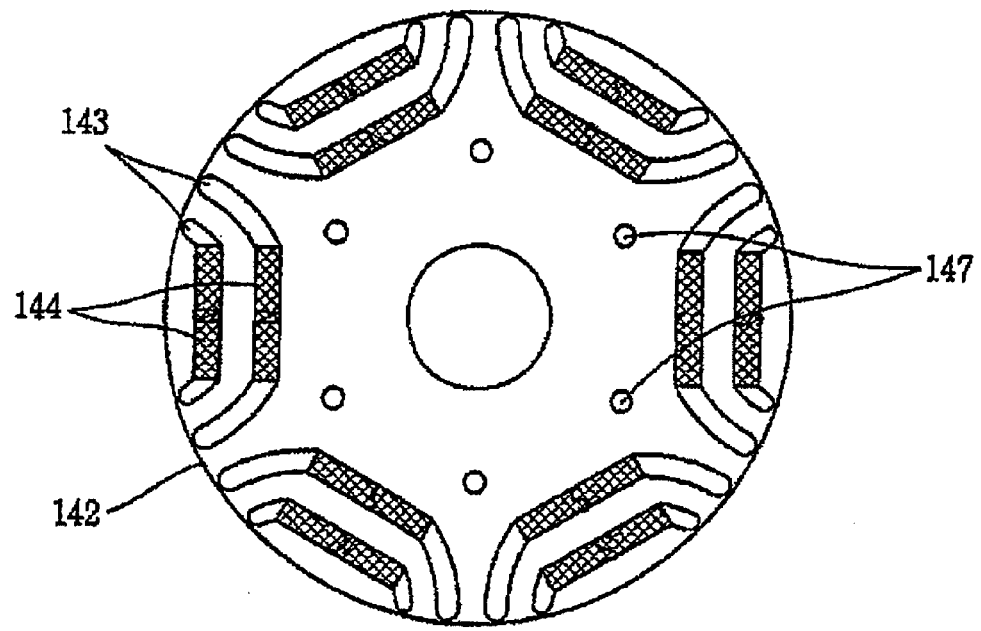
FIG. 5 is a plan view schematically illustrating a lamination core of the rotor shown in FIG. 3.

As shown in FIGS. 3 to 5, the rotor 140 includes a lamination core 141 formed by laminating a plurality of individual cores 142, a plurality of magnet members 144 inserted into the lamination core 141, first and second end plates 145 and 146 provided on both ends of the lamination core 141, respectively, and coupling members 148 engaging the first and second end plates 145 and 146 together with the lamination core 141.

Each of the cores 142 is formed by blanking silicon steel, in general. A shaft hole 142a is formed on the center of each of the cores 142, such that the rotary shaft 130 is inserted into the shaft hole 142a. Six flux barrier portions 143 are formed at 60° intervals therebetween in a circumferential direction on each of the cores 142.

The flux barrier portions 143 are formed to generate magneto-resistive difference. The flux barrier portions 143 are bored through each of the cores 142. The principle of generating torque by the magneto-resistive difference is a well-known technique, and thus a description thereof will be omitted.

The magnet members 144 are inserted into the flux barriers portions 143 in a shaft direction of the rotary shaft 130. Further, the plurality of magnet members 144 are inserted into the lamination core 141, such that magnet poles of the magnet members 144 alternate with each other in a circumferential direction of the lamination core 141. As such, as the magnet members 144 are inserted into the flux barrier portions 143, the magneto-resistive difference increases and rotating torque of the rotor increases. The rotating torque also increases by electromagnetic interaction between the magnet members 144 and the stator 120. Such a technique that increases the rotating torque by inserting the magnet members 144 into the flux barrier portions 143 is well known, and a description thereof will be omitted.

Meanwhile, the magnet members 144 have protruding portions 144a protruding from the second end plate 146 so as to be adjacent to the magnetic sensor 160. As the magnet members 144 protrude toward the magnet sensor 160, the existing process of separately assembling the sensor magnet can be omitted and an assembly error of the sensor magnet can be prevented. Therefore, it is possible to more accurately detect the position of the rotor.

In the present embodiment, all the magnet members 144 protrude from the second end plate 146. However, alternatively, any one of the magnet members 144 may protrude from the second end plate 146. In addition, unlike the present embodiment, if a distance between the magnet members 144 and the magnet sensor 160 is short enough to sense changes in magnetic flux, any portions may not protrude from the second end plate 146 but the magnet members 144 may be exposed toward the magnetic sensor 160. That is, various modifications are possible as long as the magnetic sensor 160 can sense flux changes of the magnet members 144 that are inserted into the lamination core 141.

The first and second end plates 145 and 146 are formed at both ends of the lamination core 141, respectively, and are engaged with the lamination core 141 by the coupling members 148, such as rivet bars. More specifically, the coupling members 148 are inserted into coupling grooves 147 provided on the first and second end plates 145 and 146, respectively. Thus, the coupling members 148 are engaged with the first and second end plates 145 and 146, such that the lamination core 141 and the first and second end plates 145 and 146 are engaged with each other. A plurality of through holes 146a are formed on the second end plate 146 such that the magnet members 144 penetrate through the plurality of through holes 146a toward the magnetic sensor 160.

As shown in FIGS. 1 and 2, the magnet sensor 160 is a sensor that senses the magnetic field formed by the protruding portions 144a of the magnet members 144 and converts the magnetic field into an electrical signal. As the magnet sensor 160, a hall sensor that is a magnetoelectric transducer using a hall effect may be used. The magnetic sensor 160 is not limited to the hall sensor, but various sensors, such as a magnetic reluctance element, which are able to sense changes in the magnetic field, can be applied as the magnetic sensor 160.

The power supply unit 170 supplies a current to the coil wound around the stator 120. The control unit 180 controls the time when the current is applied to the stator 120 and current intensity on the basis of the signal detected from the magnetic sensor 160. More specifically, the control unit 180 calculates the position of the rotor 140 on the basis of the signal output from the magnetic sensor 160. The control unit 180 controls the power supply unit 170 according to the calculated position of the rotor 140 and determines intensity of the current applied to the coil of the stator 120 and current supplying time, that is, current ON/OFF time. Even though the method of controlling the intensity of the current that is applied to the stator 120 and the current supplying time according to the signal detected from the magnetic sensor 160 has been schematically described above, various controlling methods are known and used already. Therefore, a description thereof will be omitted.

Figure 6:
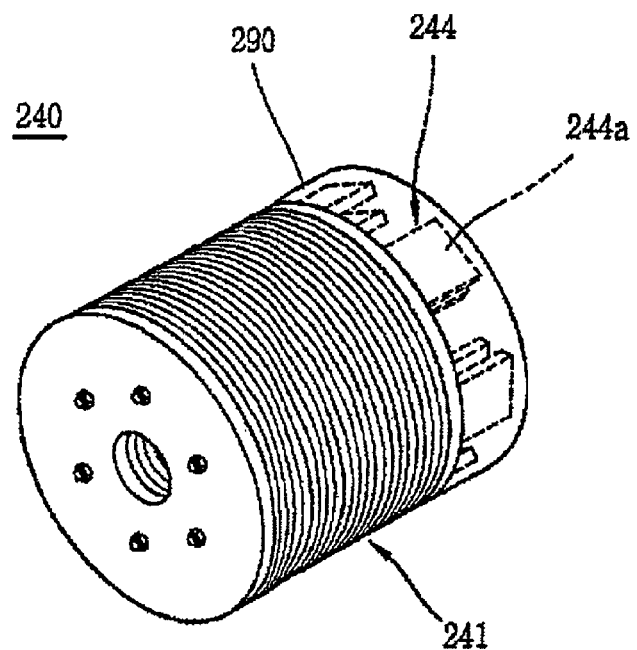
FIG. 6 is a perspective view of a rotor according to another embodiment of the present invention.

FIG. 6 is a perspective view schematically illustrating a rotor of an electric motor according to another embodiment of the present invention. According to another embodiment of the present invention, in order to support and protect protruding portions 244a, protective member 290 is provided at the protruding portions 244a of magnet members 244 that protrude from one end of a lamination core 241. Preferably, the protective member 290 is an injection molded plastic part that reduces weight. As the protective member 290 protects the protruding portions 244a of the magnetic member 244, strength of the protruding portions 244a in the form of a free end, which is exemplified in the one embodiment of the present invention, is improved and the protruding portions 244a are protected against external impact. The protective member 290 has a groove so as to correspond to the protruding portions 244a of the magnetic member 244, and the protruding portions 244a are inserted into the groove. Preferably, the protective member 290 has the same radius as a lamination core 241 so as to prevent vibrations during the rotation of the rotor 240.

Figure 7:
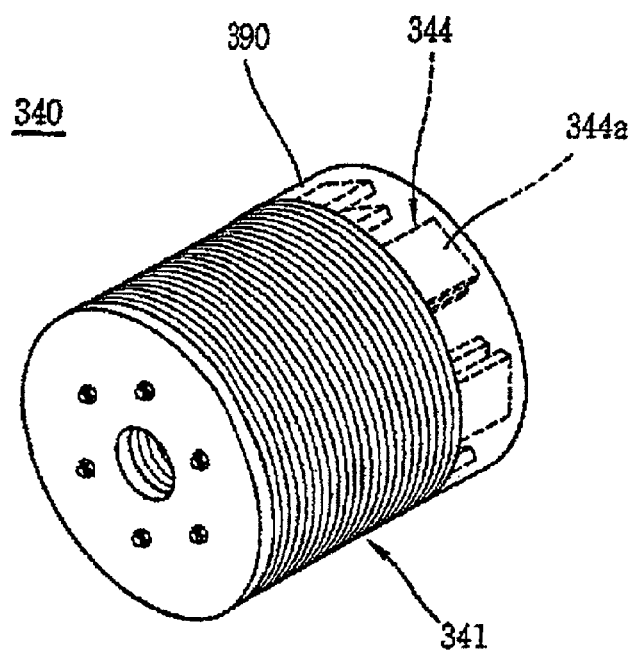
FIG. 7 is a perspective view of a rotor according to still another embodiment of the present invention.

FIG. 7 is a perspective view of a rotor of an electric motor according to a still another embodiment of the present invention. According to the still another embodiment of the present invention, the second end plate 146 (refer to FIG. 3) is removed and an injection molded plastic part couples a protective member 390. The protective member 390 is coupled with a lamination core 341 according to the same structure as the coupling structure of the second end plate 146 in accordance to the one embodiment of the present invention. However, it is preferable that part of magnet members 344 be exposed out of the protective member 390, such that the magnetic sensor 360 can sense magnetic flux. As the protective member 390 that is the injection molded plastic part is provided at protruding portions 344a, a position of a rotor 340 is detected by the magnetic sensor 160 (refer to FIG. 1) and the moment of inertia can be reduced. Further, efficiency of the electric motor can be improved.

As descried above, according to the present invention, as a structure is improved such that the magnet sensor can detect the position of the rotor from the magnet members that generate rotating torque by the electromagnetic interaction with the stator, the existing sensor magnet can be removed.

As the sensor magnet is removed, the number of components of the electric motor can be reduced and the process of assembling the sensor magnet can be omitted to thereby simplify a process of manufacturing the electric motor.

In addition, as the process of assembling the sensor magnet can be omitted, an assembly error of the sensor magnet can be prevented. Therefore, it is possible to detect the position of the rotor more accurately.

Meanwhile, the protruding portions of the magnet members are supported and protected by the protective member, such that strength of the protruding portions can be improved.

In addition, as the protective member is formed of plastic having small moment of inertia, efficiency of the electric motor can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A rotor of an electric motor, comprising:
   a lamination core formed by laminating a plurality of individual cores; and
   at least one pair of magnet members that generate rotating torque by electromagnetic interaction with a stator, wherein:
   the magnet members are coupled to the lamination core at positions which allow a magnetic sensor to sense magnetic flux generated by the magnet members,
   the magnetic members are arranged to have magnetic poles opposite to each other,
   the rotor rotates by electromagnetic interaction with the stator and a position of the rotor is detected based on the magnetic flux generated by the magnet members as sensed by the magnetic sensor,
   a plurality of flux barrier portions coupled to and arranged in a circumferential direction of the lamination core, the plurality of flux barrier portions opposing each other,
   the magnet members are individually coupled to respective ones of the flux barriers, such that the magnetic poles of the magnet members alternate with each other in the circumferential direction, and
   each magnet member has a protruding portion that is directly coupled to the lamination core, and
   each magnet member has a first end that contacts or extends through one or more individual cores of the lamination core and a second end including the protruding portion that protrudes from the lamination core in a direction adjacent to the magnetic sensor, each magnet member extending continuously from the first end to the second end.

2. The rotor of the electric motor according to claim 1, further comprising:
   first and second end plates coupled to respective ends of the lamination core,
   wherein the protruding portion of one or more of the magnet members protrudes through one of the first or second end plates in the direction adjacent to the magnetic sensor.

3. The rotor of the electric motor according to claim 2, wherein the protruding portion of each of the magnet members in said pair protrudes through said one of the first or second end plates.

4. The rotor of the electric motor according to claim 1, wherein six flux barriers are disposed at predetermined intervals in the circumferential direction of the lamination core, and wherein the magnet members are individually inserted into respective ones of the flux barrier members.

5. The rotor of the electric motor according to claim 1, wherein the protruding portions of the magnet members protrude from a first end of the lamination core, a protective member formed of plastic is provided at the first end of the lamination core so as to protect the protruding portions, and a first end plate is coupled with a second end of the lamination core.

6. The rotor of the electric motor according to claim 5, wherein the lamination core has substantially a same radius as the protective member.

7. The rotor of the electric motor according to claim 5, wherein a second end plate is interposed between the protective member and the lamination core.

8. The rotor of the electric motor according to claim 1, wherein the magnetic sensor is a hall sensor.

9. The rotor of the electric motor according to claim 1, wherein the protruding portion of each magnet member is integrally formed as one piece extending from the first end to the second end of said each magnet member.

10. The rotor of the electric motor according to claim 1, wherein the pair of magnet members extend through each individual core of the lamination core, and wherein the pair of magnet members and corresponding ones of the flux barriers are disposed in alignment between center and an outer surface of each individual core.

11. The rotor of the electric motor according to claim 1, further comprising:
first and second end plates coupled to respective ends of the lamination core,
wherein the second end including the protruding portion of each magnet member protrudes through and a predetermined distance beyond one of the first or second end plates in the direction adjacent to the magnetic sensor.

* * * * *